United States Patent Office 2,780,237
Patented Feb. 5, 1957

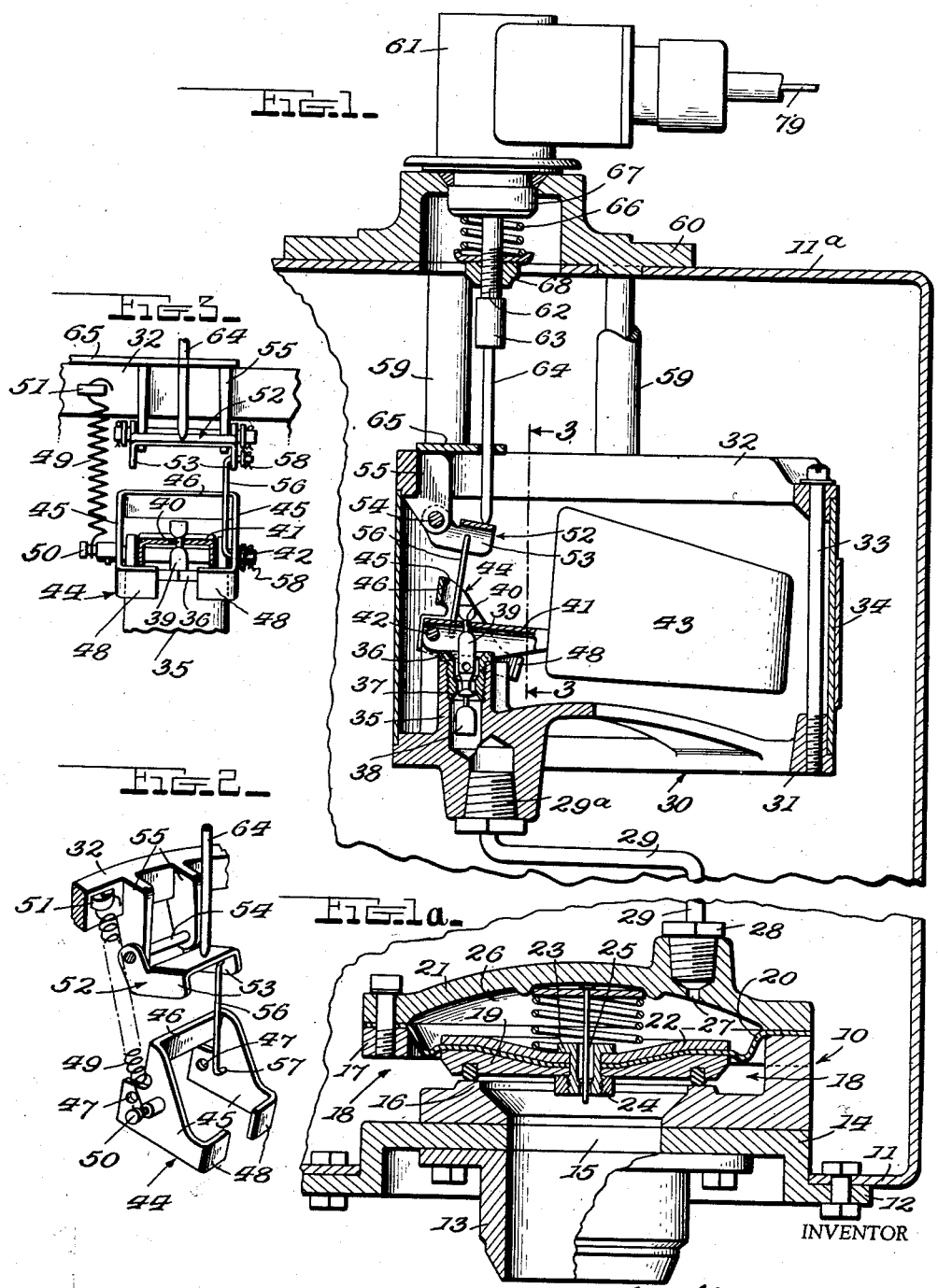

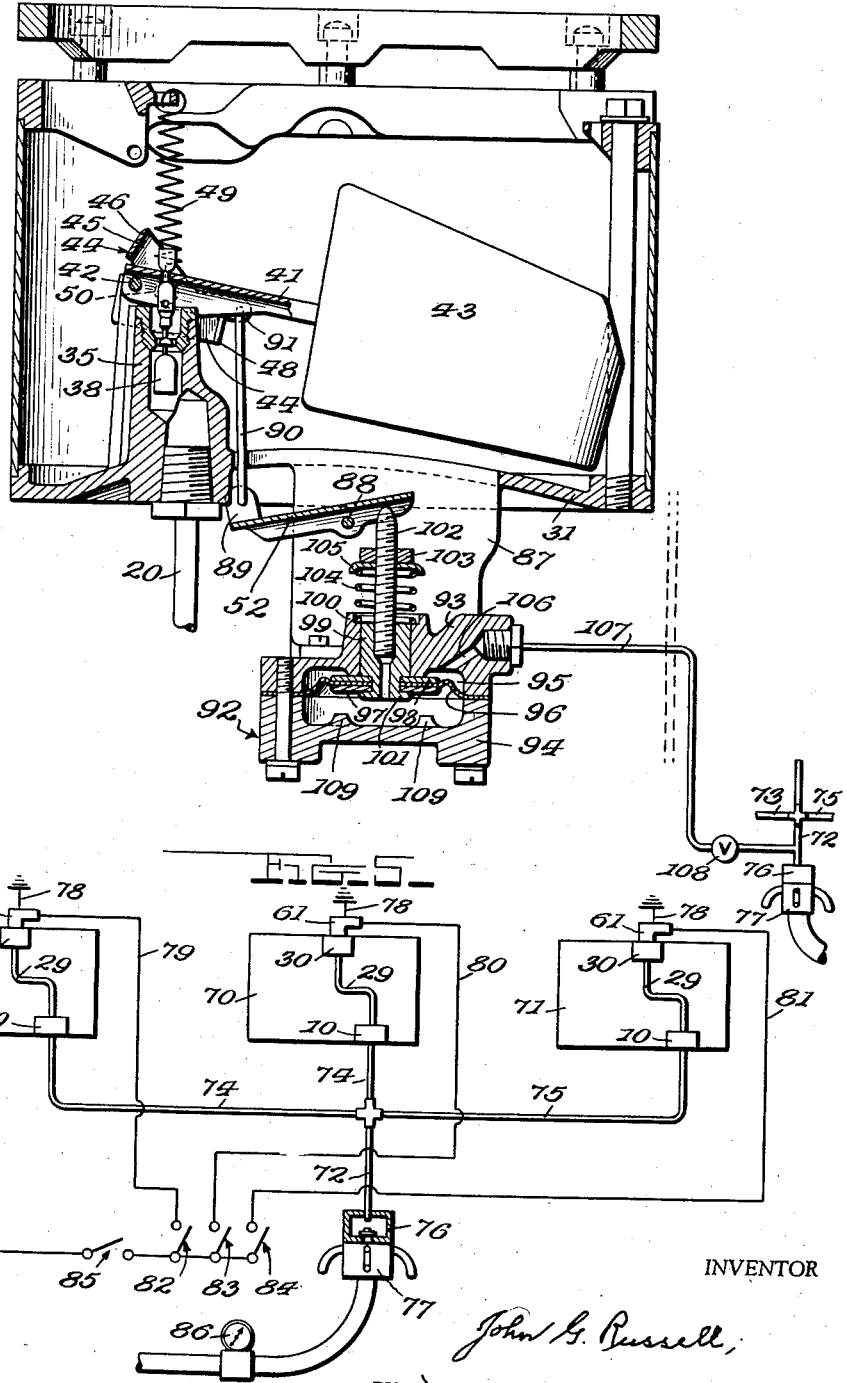

2,780,237
PRE-CHECK MECHANISM FOR A LIQUID LEVEL CONTROL VALVE

John G. Russell, Cleveland, Ohio, assignor to The Parker Appliance Company, Cleveland, Ohio, a corporation of Ohio Application March 27, 1953, Serial No. 345,079

8 Claims. (Cl. 137—390)

The invention relates to a fluid pressure operated valve for the filling of tanks with which is associated a float controlled pilot valve operating to cause the fluid pressure to close the main valve when the fluid in the tank reaches a predetermined level.

It is highly important that the pilot valve perform its function since otherwise, if it fails to close the main valve at a predetermined level of fluid in the tank, the incoming fluid would build up a pressure that may cause the tank to burst.

An object of the present invention is to provide a manually controlled pre-check mechanism associated with the pilot valve for testing the operativeness of the float controlled lever to insure that it is functioning properly before filling the tank.

Another object of the invention is to provide a pre-check mechanism of the above type which may be installed above or below the pilot valve unit.

A further object of the invention is to provide a pre-check mechanism wherein a rocker pivoted on the same center as the float lever contacts the lever from beneath when testing and raises the lever and closes the pilot valve.

A further object of the invention is to provide a pre-check mechanism wherein an auxiliary rocker is connected to the main rocker so as to move therewith and wherein a light tensioned spring is connected to the main rocker for raising the float lever when testing and a heavy tension spring operating on said auxiliary rocker overrides said light spring and moves the main rocker out of contact with the float lever to permit normal operations of said pilot valve.

A still further object of the invention is to provide a pre-check mechanism of the above type wherein a manually controlled means operates when testing upon said heavy spring for rendering the same ineffective to override said light spring and permit said light spring to raise the float lever and close the pilot valve if said pilot valve is functioning properly.

These and other objects will in part be obvious and will in part be hereinafter more fully described.

In the illustrated embodiment of the invention:

Figure 1 is a vertical sectional view through a pilot operated valve with which is associated a pre-check mechanism for testing whether or not the float lever and the valve are in operative condition;

Figure 1ᵃ is a vertical sectional view through a well known form of fluid pressure operated valve mechanism with which the pilot valve mechanism of Figure 1 is to be associated;

Figure 2 is a perspective view of the main and auxiliary rockers and also showing a light spring for oscillating the main rocker for lifting the float lever, and a plunger contacting the auxiliary rocker;

Figure 3 is a view taken on the line 3, 3 of Figure 1;

Figure 4 is a view partly in section and partly schematic showing the pilot valve and a manually operated hydraulic means disposed beneath the pilot valve and operating the pre-check mechanism associated with the pilot valve;

Figure 5 is a schematic view of a single point fueling system which includes three tanks each of which is provided with a level control valve and a pre-check mechanism associated with each level control valve.

In the preferred embodiment of the invention there is a main fluid pressure operated valve 10 which is mounted on the bottom wall 11 of a tank. There is an opening in the bottom wall in which is located a plate 12 on which the housing of the fluid pressure operating valve is mounted. Attached to this plate 12 is a depending pipe line fitting 13 which is adapted to be connected by a suitable pipe line to a fuel supply system, one example of which is illustrated in Figure 5.

The main liquid pressure operated valve 10 includes a base plate 14 having an inlet port 15 surrounded by a valve seat 16. This base plate is attached to the plate 12 and the inlet port 15 is in alignment with the depending pipe fitting 13. Formed as a part of the base plate 14 is a ring shaped member 17. This ring shaped member is spaced above the valve seat so as to provide ports 18 leading to the tank. A valve 19 is attached to a diaphragm 20 and the diaphragm is clamped against the ring 17 by means of a cap 21. There is a plate 22 on the upper side of the diaphragm. A headed sleeve 23 passes through the plate 22 and the valve 19. A nut 24 is threaded on the sleeve and clamps the valve to the diaphragm. There is a restricted opening 25 through the sleeve which connects the underside of the valve with a chamber 26 formed in the cap 21.

The cap has an opening 27 therethrough to which is attached an adapter 28. A pipe 29 is connected to the adapter 28 and leads ot an adapter 29ᵃ on the pilot valve 30 threaded into the housing of the pilot valve. The housing includes a lower member 31 having openings leading to the tank and an upper member 32 also having openings leading to the tank. There are a series of bolts 33 connecting the member 31 with the member 32 and a metal cover 34 is attached to the members 31 and 32 for enclosing the operating parts of the pilot valve mechanism. The lower member 31 has an upstanding sleeve 35 in which is threaded an adapter 36 which is provided with a valve seat 37. A valve 38 disposed below the valve seat is movable upwardly into contact with the seat and this is the closed position of the pilot valve. This pilot valve 38 is carried by a stem 39 having a reduced portion 40 which extends through an opening in the float lever 41. The float lever is preferably of sheet metal and is U-shaped in cross section. The side members of the float lever have openings through which a pivot pin 42 extends. On the outer end of the float lever 41 is a float 43. This pilot unit specifically forms no part of the present invention and further description thereof is not thought necessary.

Associated with the pilot unit is a pre-check mechanism which includes a lower rocker 44 preferably made of sheet metal shaped so as to provide side members 45, 45 and a connecting cross member 46. This rocker has rearwardly projecting portions provided with openings 47, 47 through which the pivot pin 42 of the float lever extends. The rocker 44 has inwardly extending arms 48, 48 which engage beneath the float lever. They are not attached to but merely contact with the float lever when the rocker is turned in a counterclockwise direction on the pivot pin 42.

Atached to this rocker 44 is a tension spring 49. One of the side members 45 has a lug 50 extending therefrom and the spring 49 is attached to this lug at its lower end. The upper end of the spring is attached to a lug 51 on the upper frame member 32 of the pilot housing. This spring 49 is tensioned so that it will lift the float lever with a force which overrides the force of gravity acting on the float. However, the tension force of the spring is less than the force of the buoyancy of the float. Associated with this main rocker 44 is an auxiliary rocker 52. This auxiliary rocker is preferably made of sheet metal and has a cross member with side members 53, 53 depending therefrom. These side members extend rearwardly and are carried by a pivot bolt 54 mounted in depending arms 55, 55 carried by the upper frame member 32 of the pilot housing.

A rod 56 has its lower end bent and extending through an opening 57 in the side member 45 of the main rocker. At its upper end the rod is bent so as to extend through the side member 53 of the auxiliary rocker 52. Suitable cotter pins 58 extend through the holes in the ends of the rod 56 and secure the rod to the bent portions of the rod 56 and secure the rod to the main and auxiliary rockers. This makes a connection between the rockers so that the movement of one will be imparted to the other.

The valve housing for the pilot valve is supported by depending rods 59, 59 carried by a cap plate 60 which is mounted on the upper wall 11ª of the tank. Supported on this cap plate is a solenoid indicated diagrammatically at 61 in Figure 1. Associated with the solenoid is a sleeve 62 which is attached to the core of the solenoid. There is a collar 63 at the lower end of the sleeve and depending from this collar is a plunger 64 which extends through a plate 65 on the valve housing and is adapted to engage the cross member 52 of the auxiliary rocker. There is a spring 66 between the solenoid housing 67 and a collar 68 threaded onto the sleeve 62. This spring 66 is of greater tension than the spring 49 which is connected to the main rocker. When the solenoid is deenergized the spring 66 will press the plunger 64 into engagement with the auxiliary rocker 52 and tends to turn the same in a clockwise direction. The rod 56 will operate upon the main rocker and cause the same to turn in a clockwise direction. The spring 66 being of greater tension than the spring 49 will override said spring 49 and move the arms 48 from contact with the float lever 41 and this will permit the float lever to operate in its normal way moving up and down with the level of the liquid in the tank and when the float is raised by the liquid to a predetermined level it will close the pilot valve and this will in turn cause the fluid pressure in the chamber 26 to build up to a degree that will cause the main valve 19 to close. This is the normal operation of the pilot valve controlled fluid pressure operated main valve. If the pilot valve fails to close as for example, if either the float mechanism or the valve plunger has become stuck so that the rocker 44 urged by the spring 49 has not been able to lift the float there will be no build up in the chamber 26 of the main valve and the latter will not close. The purpose of the pre-check mechanism is to test the operativeness of the float lever for closing the pilot valve before beginning a filling operation.

The current for energizing the solenoid 61 is controlled by a manually operative switch. When it is desired to test the pilot unit for normal operation the solenoid is energized. This will lift the plunger 64 rendering the spring 66 ineffective to operate upon the auxiliary rocker and when the plunger is lifted through the operation of the solenoid, then the auxiliary rocker and the main rocker are free to move under the action of the spring 49. This spring 49 will turn the rockers in a counterclockwise direction and cause the arms 48, 48 to engage the float lever and raise said float lever and float against the force of gravity unless the float lever is stuck or for some reason the pilot valve is stuck. If the float lever is free to move in the normal way it will be raised by the spring to an extreme upper position which will close the valve and when the valve is closed then the main valve 19 will also be held closed by the pressure built up in the chamber 26. If, therefore, the fluid pressure does not open the main valve the operator will know that the float lever and the valve associated therewith is operating in a normal way for closing a pilot valve. Inasmuch as the tension on the spring 49 imposes a force on the main rocker which is greater than gravity but less than the buoyance force of the liquid on the float controlled lever. It is apparent that if the spring 49 can raise the lever to close the valve the bouyancy of the liquid when the float has reached a predetermined level will likewise close the pilot valve, and conditions are normal.

In Figure 5 there is illustrated a typical single point fueling system utilizing a pre-check mechanism of the present invention. In this illustration there are three fuel tanks 69, 70 and 71. Each tank is provided at its lower end with a fluid pressure operated main valve 10 and a float operated pilot valve 30 connected to the former by a pilot tubing line 29. The inlet fittings 13 associated with the main valve 10 of the tanks are connected to a common intake line 72 by means of pipe lines 73, 74 and 75. The line 72 has a valve 76 connected thereto and to this valve 76 is adapted to be attached the supply nozzle 77. The solenoid 61 associated with each float operated pilot valve has one of the electrical leads 78 grounded and the other leads 79, 80 and 81 connected to switches 82, 83 and 84 respectively. The circuits are controlled by a master switch 85, in turn connected to a battery.

When it is desired to fill any or all of the tanks 69, 70 and 71 the supply nozzle 77 is attached to the single point intake valve 76. At this point each of the main valves 10 is in closed position as shown in Figure 1, and since the tanks are empty each of the floats 43 are in their lowermost position due to gravity action as illustrated in Figure 1. Also the solenoids 65 are deenergized and the spring 66 causes the solenoid extension or plunger 64 to force the auxiliary rocker 52 to the position shown in Figure 1. This will force the main rocker 44 to a position where it is out of lifting contact with the float lever. When the fluid supply is turned on to introduce fluid under pressure to the ports 15 of each main valve, some of the fluid passes through the restricted opening 25 and the pipe line 29 to the pilot port surrounded by the valve seat 37 and through this port into the pilot valve housing and then to the tank. All of the passages between the pressure chamber 26 and the interior of the tank are of greater flow capacity than the restricted orifice 25 and hence while these passages are open there will be no build up of pressure within the chamber 26 and fluid pressure against the underside of the valve will cause the valve to open and fluid to flow into the tank. When the tank has been filled to a predetermined level the float 43 will be buoyed upwardly by the fluid, moving the pilot valve to a closed position. The pressure on the chamber 26 will now build up and act upon the upper side of the valve 19 and supporting diaphragm 20 so as to close the valve against the pressure of the incoming fluid.

Before proceeding with a filling operation the operation of the pilot valve may be tested by the pre-check mechanism associated with each pilot valve. First the switches 85, 82, 83, and 84 are all closed, then the fuel supply from the nozzle 81 is turned on. Closures of the switches energizes each solenoid 65 and causes the plunger extension 64 associated therewith to be retracted. This permits the spring 49 of each of the pilot valves to move the main rocker 44 in a counterclockwise direction as viewed in Figure 1. This movement causes the arms 48 of the rocker member to engage the float arm 41 and lift the float to a full raised position which will close the pilot valve. The closure of the pilot valve in this manner results in the closure of the main fluid pressure operated valve 19 in the manner already described. If all of the pilot valves and the main fluid pressure operated valves are functioning normally, and if the supply from the nozzle is now turned on, there will be no flow, which condition will be indicated by a flow meter 86.

If any of the pilot valves fail to close, as for example, if either the pilot mechanism or the valve plunger has become stuck so that the rocker member urged by the spring 49 has not been able to lift the float, there will be no build up in the chamber 26 of the main valve and the latter will not close. Likewise if the main valve 20 has become stuck in the open position, or if the diaphragm 21 should be ruptured, there will be flow of fluid into the respective tanks and the flow will be registered on the flow meter 86 and thus will indicate to the operator that at least one of the pilot valve units is not functioning properly. To determine which valve it is, the operator closes the switch 85 and each of the switches 82, 83, and 84 separately and through the flow meter. The operator may determine which of the tanks has a pilot valve that is not functioning properly.

There is another application for the pre-check mechanism and that is to filling of selected tanks. Let us assume that all of the pilot valves are functioning properly and it is desired to fill only the tank 71 as shown in Figure 5. The main switch 85 and the switches 82 and 83 will be closed and this will cause the float levers in the tanks 69 and 70 to be raised to closed position through the action of the pre-check mechanism. Inasmuch as the switch 84 is not closed then the pilot valve will not be raised by the pre-check mechanism and will operate in its normal way for filling of the tank 71.

In an optional arrangement a hydraulic actuator may be substituted for the solenoid assembly as shown in Figure 4. In Figure 1 the solenoid assembly is disposed above the pilot valve while in Figure 4 the hydraulic actuator is disposed below the pilot valve. The hydraulic actuator could be placed above the pilot valve and likewise the solenoid assembly could be disposed beneath the pilot valve.

The pilot valve shown in Figure 4 is of the same construction as that shown in Figure 1 and like numerals will be applied thereto to indicate the various elements of the pilot mechanism. The main rocker 44 is mounted on the pivot pin 42 for free oscillations thereon. This main rocker is provided with arms 48, 48 which extend beneath the side members respectively of the float lever 41. A comparatively light tension spring 49 is attached to a lug 51 at its upper end and at its lower end it is attached to a lug 50 on the main rocker 44. This spring when free to act will oscillate the main rocker in a counter-clockwise direction and cause the arms 48 to engage beneath the float lever 41 and raise the float lever to its extreme upper position which closes the valve 38.

The frame member 31 carries a depending bracket 87 and the auxiliary rocker 52 is pivoted at 88 to this depending bracket 87. This pivot 88 is disposed between the ends of the auxiliary rocker. At the left hand end of this auxiliary rocker is an upstanding lug 89. The rod 90 is pivoted to the lug at its lower end and is pivoted at its upper end to an ear 91 projecting from the main rocker 44. This rod connects the main and auxiliary rocker so that they will move together about their respective pivots.

Also mounted on the depending bracket 87 is a hydraulic actuator 92. This hydraulic actuator includes an upper member 93 to which is attached a lower member 94. These members are so shaped as to provide a chamber 95. Extending across the chamber and clamped between the upper and lower members is a diaphragm 96. Mounted on this diaphragm 96 are two plates 97 and 98. Attached to the two plates and the diaphragm is a sleeve 99. This sleeve moves freely vertically in a hub 100 formed as an integral part of the upper member 93. The sleeve 99 has a reduced portion which extends through openings in the plates and the diaphragm and the end of the reduced portion is clinched over against the plates indicated at 101. Threaded into this sleeve is a plunger 102. The plunger is threaded, and mounted thereon is a nut 103. A spring 104 engages an abutment plate 105, bearing against the nut. The lower end of the spring abuts against the hub 100. The upper end of the plunger makes contact with the right hand end of the auxiliary rocker 52.

The diaphragm 96 divides the chamber 95 into upper and lower portions. The upper portion of the chamber is connected by a passage 106 to a suitable ported adapter and the adapter in turn is connected to a pipe line 107 which in turn is connected to the supply pipe 72. This supply pipe is connected to a valve housing 76 and a nozzle 77 may be detachably connected to this housing 76. The pipes 73, 74, and 75 lead to tanks in the manner described in connection with Figure 5. In the pipe line 107 is a valve 108. The hydraulic actuator operates in the same manner as the solenoid assembly when testing the pilot valve for operativeness. The valve 108 is opened and this will direct fluid into the chamber portion above the diaphragm which will cause the diaphragm to move downwardly until the plate 97 contacts limiting lugs 109. This will withdraw the plunger from contact with the auxiliary rocker 52. The spring 104 is rendered ineffective to operate the auxiliary rocker when the fluid is in the upper portion of the chamber. When the plunger is withdrawn so that the auxiliary rocker is free to move this will also permit the main rocker to oscillate freely in a counter-clockwise direction. The spring 49 is now free to oscillate the rocker 44 and raise the float and float lever to their extreme upper position, thus closing the pilot valve. This in turn will cause the main valve to close. After admitting fluid to the hydraulic actuator the supply fluid is admitted to the fluid pressure valve intake and if the pilot valve is closed the fluid pressure on the chamber 26 will build up to a point so that said valve will not open. If the main valve does not close then it is apparent that the pilot valve or the float lever are stuck so that they cannot perform their normal functioning. This warns the operator to correct the conditions so that the pilot valve will function in its normal manner. The spring 49 is of sufficient tension so as to lift the pilot valve under normal conditions, but is insufficient in force to overcome the force of buoyancy acting on the float controlled lever. Therefore, if the spring can raise the float lever to close the pilot valve the operator will know that the pilot valve is operating under normal conditions and will, during filling, cause the main fluid pressure operated valve to close when the level of the fluid in the tank reaches a predetermined level. This hydraulic actuator can be used in connection with a series of tanks and perform all the functions of the solenoid assembly.

From the foregoing it will be apparent that the rocker 44 constitutes a main device which is movably mounted and has a member or portion 48 extending adjacent (specifically under) the float lever 41 so as to be movable into engagement with the lever for raising the same and bringing about a closing of the pilot valve. The second rocker 52 constitutes a second device which is connected at 56 or 90 with the first rocker or main device so that the movements of one said device will be imparted to the other. The spring 49 constitutes an actuating means connected with the main device or rocker 44 and constantly tending to move the rocker 44 to raise the float lever 41 to a position for bringing about a closing of the pilot valve. The spring pressed plunger 64 or 102 constitutes means normally engaging the rocker 52 to hold it against movement in the float lever raising direction thereby to permit normal operation of the float 43, and the means 61 or 96 constitutes manually controlled power means for displacing the holding means 64 or 102 so as to permit the actuating means 49 to move the rocker 44 to bring about a closing of the pilot valve.

While there has been described and illustrated a spring 49 for raising the float lever and closing the valve it is obvious that a weight may be employed for this purpose without departing from the spirit of the invention set forth in the claims. In such case the weight may be attached to either the rocker 44 or the rocker 52 and the energy exerted by said weight for closing the valve should be the same as that exerted by the spring 49.

It is obvious that minor changes in the details of construction and arrangement of parts may be made without departing from the spirit of the invention set forth in the appended claims.

I claim:

1. A pre-check mechanism for a float controlled pilot valve having a valve closing lever carrying a float comprising a main device movably mounted and having a member extending adjacent the float lever and so disposed with relation to said lever as to be movable into engagement therewith for raising the lever and bringing about a closing of the pilot valve, a second movably mounted device, means for connecting said first-named and second devices so that the movements of one will be imparted to the other, an actuating means connected to said first-named device and constantly tending to move said first-named device to raise said float lever to a position for bringing about a closing of the pilot valve, means normally engaging said second device to hold it against movement in the float lever raising direction thereby to permit normal operation of the float, and manually controlled power means for displacing said holding means so as to permit said actuating means to move said first-named device to bring about a closing of the pilot valve.

2. A pre-check mechanism for a float controlled pilot valve having a valve closing lever carrying a float comprising a first rocker rockably supported and having a member extending adjacent the float lever and so disposed with relation to said lever as to be movable into engagement therewith for raising the lever and bringing about a closing of the pilot valve, a second rockably mounted rocker, means for causing the movements of one rocker to be imparted to the other, an actuating device connected to said first rocker and constantly tending to move said first rocker to raise said float lever to a position for bringing about a closing of the pilot valve, means normally engaging said second rocker to hold it against movement in the float lever raising direction thereby to permit normal operation of the float, and manually controlled power means for displacing said holding means so as to permit said actuating device to move said first rocker to bring about a closing of the pilot valve.

3. A pre-check mechanism for a float controlled pilot valve having a valve closing lever carrying a float comprising a first rocker rockably supported and having a member extending adjacent the float lever and so disposed with relation to said lever as to be movable into engagement therewith for raising the lever and bringing about a closing of the pilot valve, a second rockably mounted rocker, means for causing the movements of one rocker to be imparted to the other, an actuating device connected to said first rocker and constantly tending to move said first rocker to raise said float lever to a position for bringing about a closing of the pilot valve, means normally engaging said second rocker to hold it against movement in the float lever raising direction thereby to permit normal operation of the float, said last named means including a plunger, a spring for forcing said plunger into engagement with said second rocker, and manually controlled power means for withdrawing the plunger from engagement with the actuating device whereby said actuating device will operate to bring about a closing of the pilot valve.

4. A pre-check mechanism for a float controlled pilot valve having a valve closing lever carrying a float comprising a main rocker having members extending beneath the float lever, a spring for moving said rocker into engagement with the float lever for raising the lever and closing the pilot valve, a second rocker, means whereby the movements of one rocker will be imparted to the other, a spring actuated plunger operating upon said second, said last-named spring having sufficient tension to overcome the tension of the first named spring for moving the main rocker out of lifting contact with the floating lever, and manually controlled power means for rendering said spring actuating plunger inactive so as to permit the first-named spring to operate and close the pilot valve said second actuating device operating when released from the control of the power means to move the main rocker from lifting contact with the float lever for permitting normal operation of said float.

5. A pre-check mechanism for a float controlled pilot valve having a valve closing lever carrying a float comprising a main rocker having members extending beneath the float lever, a spring for moving said rocker into engagement with the float lever for raising the lever and closing the pilot valve, a second rocker, means whereby the movements of one rocker will be imparted to the other, a spring actuated plunger operating upon said second rocker, said last-named spring having sufficient tension to overcome the tension of the first named spring for moving the main rocker out of lifting contact with the floating lever, a solenoid to which said plunger is connected, said solenoid having sufficient energy to override the spring actuated plunger for withdrawing the plunger from engagement with the second rocker and permitting the first-named spring to lift the float lever and close the pilot valve said spring actuated plunger operating when the solenoid is deenergized to move the main rocker out of lifting contact with the float lever for permitting normal operation of the float.

6. A pre-check mechanism for a float controlled pilot valve having a valve closing lever carrying a float comprising a main rocker having members extending beneath the float lever, a spring for moving said rocker into engagement with the float lever for raising the lever and closing the pilot valve, a second rocker, means whereby the movements of one rocker will be imparted to the other, a spring actuated plunger operating upon said second rocker, said last-named spring having sufficient tension to overcome the tension of the first named spring for moving the main rocker out of lifting contact with the float lever, and manually controlled fluid operating means for withdrawing said plunger from engagement with said second rocker and permitting said first named spring to act through said first named rocker and close the pilot valve said spring actuated plunger operating when released from control of said fluid operating means to move the main rocker out of lifting contact with the float lever for permitting normal operation of said float.

7. A pre-check mechanism for a float controlled pilot valve having a valve closing lever carrying a float comprising a main rocker having members extending beneath the float lever, a spring for moving said rocker in a clockwise direction into engagement with the float lever for raising the lever and closing the pilot valve, a second rocker, means whereby the movements of one rocker will be imparted to the other, a spring actuated plunger operating upon said second rocker, said last named spring having sufficient tension to overcome the tension of the first-named spring and move the main rocker in a clockwise direction out of lifting contact with the float lever, and manually controlled means for withdrawing the plunger from engagement with said second rocker so as to permit the first-named spring to act through said first-named rocker and close the pilot valve said spring actuated plunger operating when released from the control of the manual means to move the main rocker out of lifting contact with the float lever for permitting normal operation of said float.

8. A pre-check mechanism for a float controlled pilot valve having a valve closing lever carrying a float comprising an actuator pivotally mounted and engageable with the float mechanism for moving the same to valve closing position, a rocker arm pivotally mounted on the pilot valve housing and connected with the actuator for pivotal movement in unison therewith, means constantly urging the actuator toward valve closing engagement with the float assembly, an overriding device normally preventing the actuator from moving the float assembly to valve closing position, and means for rendering the overriding device ineffective whereby the actuator will move the float assembly to valve closing position said overriding device operating when released from the means rendering it ineffective to move said actuator from engagement with the float mechanism for permitting normal operation of said float assembly.

References Cited in the file of this patent

UNITED STATES PATENTS

| | | |
|---|---|---|
| 2,183,815 | Johnson | Dec. 19, 1939 |
| 2,199,538 | Curry | May 7, 1940 |
| 2,309,770 | Johnson | Feb. 2, 1943 |
| 2,477,186 | Koehler | July 26, 1949 |
| 2,619,108 | Sweeney | Nov. 25, 1952 |